(12) United States Patent
Meganathan

(10) Patent No.: US 10,306,403 B2
(45) Date of Patent: May 28, 2019

(54) LOCATION BASED DYNAMIC GEO-FENCING SYSTEM FOR SECURITY

(71) Applicant: Honeywell International Inc., Morris Plains, NJ (US)

(72) Inventor: Deepak Sundar Meganathan, Bangalore (IN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/227,694

(22) Filed: Aug. 3, 2016

(65) Prior Publication Data

US 2018/0160260 A1 Jun. 7, 2018

(51) Int. Cl.
*G08B 21/02* (2006.01)
*H04W 4/021* (2018.01)
(Continued)

(52) U.S. Cl.
CPC ...... *H04W 4/021* (2013.01); *G08B 13/19682* (2013.01); *G08B 21/02* (2013.01);
(Continued)

(58) Field of Classification Search
CPC ............ G06Q 30/018; G06Q 30/0248; G06Q 10/06311; G06F 17/3089; G08B 25/14
USPC ... 340/539.11, 506, 573.4, 539.13, 507–510, 340/679, 680, 681, 682, 683, 691, 340/511–513
See application file for complete search history.

(56) References Cited

U.S. PATENT DOCUMENTS 6,255,988 B1 7/2001 Bischoff
6,356,282 B2 3/2002 Roytman et al.
(Continued)

FOREIGN PATENT DOCUMENTS

AU 2015201441 A1 10/2015
CN 101689327 B 5/2013
(Continued)

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.
(Continued)

*Primary Examiner* — Daniel Previl
(74) *Attorney, Agent, or Firm* — Seager, Tufte & Wickhem LLP

(57) ABSTRACT

A dynamic integrated security system having a user interface with a display connected to the processor. A plurality of security devices may be situated in a geographical area. A security perimeter may be placed around a high profile entity initiated by a threat level having a predetermined magnitude. The security perimeter may be a geo-fence that encompasses a geo area around the high profile entity. The geo area may encompass one or more security devices. The one or more security devices in the geo area may be connected to the processor. The geo area may move and stay with the high profile entity upon a change of geographic position of the high profile entity. The one or more security devices within the geo area may be monitored and controlled for reducing or preventing effects of the threat level against the high profile entity.

20 Claims, 5 Drawing Sheets

(51) Int. Cl.
*H04W 4/029* (2018.01)
*H04L 29/08* (2006.01)
*H04N 7/18* (2006.01)
*G08B 25/00* (2006.01)
*G08B 13/196* (2006.01)
*H04W 4/04* (2009.01)

(52) U.S. Cl.
CPC ............ *G08B 25/00* (2013.01); *H04L 67/125* (2013.01); *H04N 7/181* (2013.01); *H04W 4/029* (2018.02); *H04W 4/022* (2013.01); *H04W 4/043* (2013.01)

(56) References Cited

U.S. PATENT DOCUMENTS

| | | |
|---|---|---|
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,614,567 B2 | 11/2009 | Chapman, Jr. et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,232,877 B2 | 7/2012 | Husain |
| 8,255,090 B2 | 8/2012 | Frader-Thompson et al. |
| 8,269,620 B2 * | 9/2012 | Bullemer ............ G05B 23/0272 340/506 |
| 8,280,536 B1 | 10/2012 | Fadell et al. |
| 8,301,765 B2 | 10/2012 | Goodman |
| 8,332,055 B2 | 12/2012 | Veillette |
| 8,350,697 B2 | 1/2013 | Trundle et al. |
| 8,386,082 B2 | 2/2013 | Oswald |
| 8,390,473 B2 | 3/2013 | Krzyzanowski et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,531,294 B2 | 9/2013 | Slavin et al. |
| 8,554,374 B2 | 10/2013 | Luncek et al. |
| 8,554,714 B2 | 10/2013 | Raymond et al. |
| 8,571,518 B2 | 10/2013 | Imes et al. |
| 8,587,445 B2 | 11/2013 | Rockwell |
| 8,626,344 B2 | 1/2014 | Imes et al. |
| 8,630,741 B1 | 1/2014 | Matsuoka et al. |
| 8,648,706 B2 | 2/2014 | Ranjun et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,288,620 B2 | 3/2016 | Menendez |
| 9,292,022 B2 | 3/2016 | Ramachandran et al. |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,636 B2 | 6/2016 | Ganesh et al. |
| 9,363,772 B2 | 6/2016 | Burks |
| 9,414,422 B2 | 8/2016 | Belghoul et al. |
| 9,432,807 B2 | 8/2016 | Kern, Jr. et al. |
| 9,433,681 B2 | 9/2016 | Constein et al. |
| 9,449,491 B2 | 9/2016 | Sager et al. |
| 9,477,239 B2 | 10/2016 | Bergman et al. |
| 9,495,866 B2 | 11/2016 | Roth et al. |
| 9,521,519 B2 | 12/2016 | Chiou et al. |
| 9,552,002 B2 | 1/2017 | Sloo et al. |
| 9,560,482 B1 | 1/2017 | Frenz |
| 9,589,435 B2 | 3/2017 | Finlow-Bates |
| 9,594,384 B2 | 3/2017 | Bergman et al. |
| 9,618,227 B2 | 4/2017 | Drew |
| 2002/0147006 A1 | 10/2002 | Coon et al. |
| 2005/0172056 A1 | 8/2005 | Ahn |
| 2005/0225634 A1 * | 10/2005 | Brunetti ............ G08B 13/19608 348/143 |
| 2006/0063522 A1 | 3/2006 | McFarland |
| 2006/0097063 A1 | 5/2006 | Zeevi |
| 2007/0037605 A1 | 2/2007 | Logan |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 * | 4/2008 | Mock ...................... G08B 1/08 340/573.4 |
| 2010/0034386 A1 | 2/2010 | Choong et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2011/0153525 A1 | 6/2011 | Benco et al. |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0073094 A1 | 3/2013 | Knapton et al. |
| 2013/0225196 A1 | 8/2013 | James et al. |
| 2013/0310053 A1 | 11/2013 | Srivastava et al. |
| 2013/0318217 A1 | 11/2013 | Imes et al. |
| 2014/0156087 A1 | 6/2014 | Amundson |

(56) References Cited

U.S. PATENT DOCUMENTS

| | | | |
|---|---|---|---|
| 2014/0164118 A1* | 6/2014 | Polachi | G06Q 30/0259 705/14.57 |
| 2014/0172176 A1 | 6/2014 | Deilmann et al. | |
| 2014/0200718 A1 | 7/2014 | Tessier | |
| 2014/0302879 A1 | 10/2014 | Kim et al. | |
| 2014/0330435 A1 | 11/2014 | Stoner et al. | |
| 2014/0337123 A1 | 11/2014 | Nuernberg et al. | |
| 2014/0370911 A1 | 12/2014 | Gorgenyi et al. | |
| 2015/0094860 A1 | 4/2015 | Finnerty et al. | |
| 2015/0140994 A1 | 5/2015 | Partheesh et al. | |
| 2015/0141045 A1 | 5/2015 | Qiu et al. | |
| 2015/0163631 A1 | 6/2015 | Quam et al. | |
| 2015/0163945 A1 | 6/2015 | Barton et al. | |
| 2015/0186497 A1 | 7/2015 | Patton et al. | |
| 2015/0193936 A1* | 7/2015 | Warzelhan | G08B 13/19608 382/103 |
| 2015/0237470 A1* | 8/2015 | Mayor | H04W 4/021 455/456.2 |
| 2015/0271638 A1 | 9/2015 | Menayas et al. | |
| 2015/0301543 A1 | 10/2015 | Janoso et al. | |
| 2016/0048128 A1 | 2/2016 | Schmidt et al. | |
| 2016/0057572 A1 | 2/2016 | Bojorquez Alfaro et al. | |
| 2016/0071399 A1* | 3/2016 | Altman | G10L 15/02 340/539.11 |
| 2016/0142872 A1 | 5/2016 | Nicholson et al. | |
| 2016/0223998 A1 | 8/2016 | Songkakul et al. | |
| 2016/0261424 A1 | 9/2016 | Gamberini | |
| 2016/0286033 A1 | 9/2016 | Frenz et al. | |
| 2016/0313749 A1 | 10/2016 | Frenz | |
| 2016/0313750 A1 | 10/2016 | Frenz et al. | |

FOREIGN PATENT DOCUMENTS

| | | |
|---|---|---|
| EP | 1515289 A1 | 3/2005 |
| EP | 2675195 A2 | 12/2013 |
| MX | 2012000906 A | 9/2012 |
| WO | 2009034720 A1 | 3/2009 |
| WO | 2009036764 A2 | 3/2009 |
| WO | 2011011404 A1 | 1/2011 |
| WO | 2012000107 A1 | 1/2012 |
| WO | 2013170791 A1 | 11/2013 |
| WO | 2014016705 A2 | 1/2014 |
| WO | 2014047501 A1 | 3/2014 |
| WO | 2014144323 A1 | 9/2014 |
| WO | 2014197320 A1 | 12/2014 |
| WO | 2014200524 A2 | 12/2014 |
| WO | 2015047739 A1 | 4/2015 |
| WO | 2015089116 A1 | 6/2015 |

OTHER PUBLICATIONS

"Petition for Inter Partes Review of U.S. Pat. No. 8,571,518 Pursuant to 35 U.S.C. 311-319, 37 CFR 42," Inventor Imes et al., dated Oct. 29, 2014.
The Extended European Search Report and Opinion for EP Application No. 16156760.7-1862, dated Jul. 8, 2016.
The Extended European Search Report for EP Application No. 1619416, dated Feb. 2, 2017.
The Extended European Search Report for EP Application No. 16196128.9, dated Mar. 7, 2017.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 15/048,902, filed Feb. 19, 2016.
Do, "Programmable Communicating Thermostats for Demand Response in California," DR ETD Workshop, 26 pages, Jun. 11, 2007.
Gentec, "Feature Focus, Threat Level Management," 2 pages, 2013.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http://IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.

* cited by examiner

LOCATION BASED DYNAMIC GEO-FENCING SYSTEM FOR SECURITY

BACKGROUND

The present disclosure pertains to security systems and particularly to such systems designed to protect a specific entity.

SUMMARY

The disclosure reveals a dynamic integrated security system having a user interface with a display connected to the processor. A plurality of security devices may be situated in a geographical area. A security perimeter may be placed around a high profile entity initiated by a threat level having a predetermined magnitude. The security perimeter may be a geo-fence that encompasses a geo area around the high profile entity. The geo area may encompass one or more security devices. The one or more security devices in the geo area may be connected to the processor. The geo area may move and stay with the high profile entity upon a change of geographic position of the high profile entity. The one or more security devices within the geo area may be monitored and controlled for reducing or preventing effects of the threat level against the high profile entity.

DESCRIPTION

Figure 1:
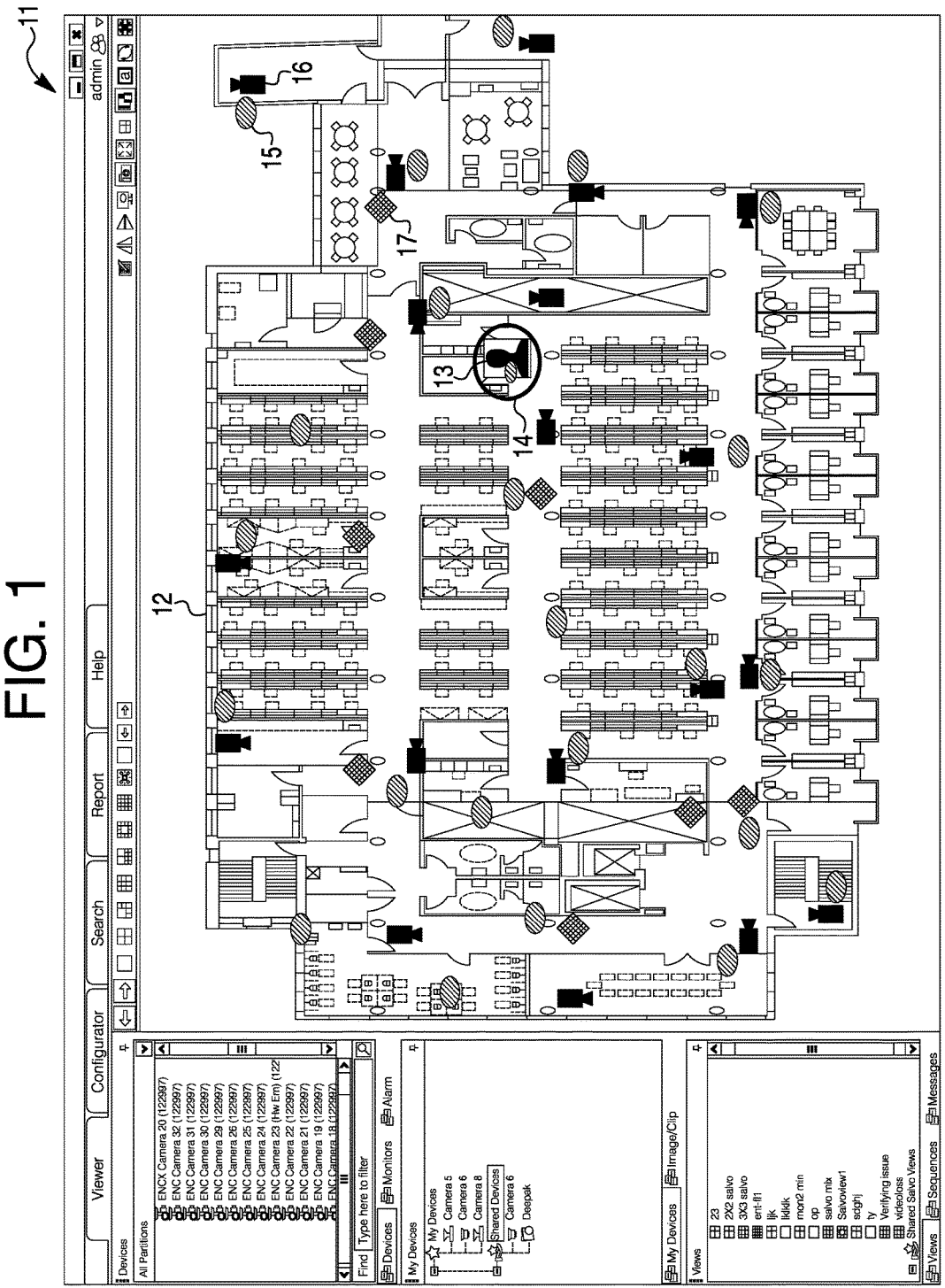
FIG. 1 is a diagram of an example screen of a floor in a building having a high profile person or visitor or object or vehicle subject to location monitoring.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

An approach may have a location-based dynamic "high security zone" and dynamic geo-fencing to improve the security of the object or person in the integrated security system.

Threat level management may be one of the key features used in an integrated security system. Mainly to change the behavior of the security system based on the security conditions and threats in the premises, threat level management may often be used to detect and define a "high security zone" in the premises. Most of the time, high security zone and high threat level areas may be preconfigured and triggered based on a need. Threat levels and actions may be triggered based on alarms or user actions and most of the time these can be preconfigured.

In a present integrated security system, there is not necessarily logic of location based threat level increasing; for example, if some high profile visitor is entering the premises, then a manned guard or escort may be assigned and these activities can happen outside the system. For instance, a location of the high profile visitor and current security conditions around the visitor are not necessarily known to the system. But there appears to be need to have separate security circle based the movement of the person or object in the premises to have better control and to maintain the security of the person or object. Examples may include a minister visiting a university, high profile customer visiting casino, or a guard is patrolling the secured area, and so on . . . .

A present approach may be based on detecting and tracking a real-time location of the high profile person or object, and defining the dynamic/virtual geo-fencing and applying a high threat level or high security zones to a geo-fenced area. The security devices that fall under the virtual geo-fenced area may be activated with a high threat level. Device details and camera feeds that fall under geo-fenced area may be monitored at a central or remote monitoring station.

A high profile person or object may be a minister/president is visiting university or school, a high profile visitor in the campus/premises/airport, high profile visitors in power plant, a high profile customer visiting casino for gambling, a guard patrolling and guard tour in a secured area or premises, a guard patrolling in a prison, or an ATM cash loading vehicle entering premises.

All the security devices that fall under the virtual geo-fenced area may be activated with a high threat level. This may include a change access cardholder, visitor access rights, an increase camera parameters (e.g., on resolution, quality, FPS, or bit-rates.), locking and unlocking of access doors, and sending notifications to security guards or officials.

An infrastructure may incorporate some of the following features. An integrated security system (access, video and intrusion) may have an integration with indoor location sensing system, and each security device having location sensors or being paired with location sensors. Location sensors may be BLE based or low/long range RF tags, or similar technology. The location sensors, locations of the security devices and sensors may be mapped and configured in a site map, floor map or building information modeling (BIM)/3D model.

A flow of the approach may be noted. Once a critical or high profile visitor or person or object or vehicle is identified, then the visitor or person may be equipped with location tags. If it is a person, location tag may be given to that person at the time of entry. If it is vehicle, then location tag may be attached at the time of entry.

Once the person or object starts moving, location may be tracked and sent to a system. The system may check the location of the person or object and define a geo-fencing. The system may check the security devices that fall under the geo-fenced area, and move them to a high threat level. This check may also include logical devices like camera mapped ones with an access door. This approach may keep updates based on the location of the secured object or person. These data may be saved in the system for further review.

The approach may have dynamic threat level adjustment and dynamic geo-fencing.

The approach may be based on existing access control and a video surveillance system infrastructure. This approach may be put into practice with various products.

Specialized security coverage may be given to high profile visitors, vendors, or any critical moving object/person. As the approach defines the dynamic high threat/secured geo-fencing, not all system resources and environments may be disturbed by a meaning of threat level management but only a certain area. This may result in a controller environment within the geo-fenced area, and at the same time outside the geo-fenced area may function without many changes. This approach may result in increasing the confidence of the high profile visitors.

The approach may be based on existing access control and video surveillance system infrastructure and this may be put into practice with various products.

Components of approach may incorporate: 1) High profile person/visitor or object/vehicle location monitoring, security device (camera, access doors, intrusion sensors, location sensor) locations on map view; 2) Dynamic geo-fencing and applying high threat level to geo-fenced area/(Floor Map)—1; 3) Dynamic geo-fencing and applying high threat level to geo-fenced area/(Floor Map)—2; 4) Dynamic geo-fencing and applying high threat level to geo-fenced area (BIM); and 5) Dynamic geo-fencing and applying high threat level to geo-fenced area (open area/city wide).

The present approach may be based on detecting and tracking the real-time location of the high profile person or object and defining the dynamic/virtual geo-fencing and applying high threat level to geo-fenced area. Device details, and camera feeds may be monitored on the central or remote monitoring station A claim may focus on the way the present approach updates a threat-level of high profile visitor or vehicle surrounding area and defines the dynamic geo-fencing.

An extension of approach may have, on a need basis, a user that can modify and alter the geo-fencing area and instantly reflects it in the system and activate the high threat level for the added devices by the adjustment of removed few devices.

The approach may be extended to mobile and cloud platforms, and to wearable location sensing.

A threat level of a particular area or facility may be a predetermined value Y, which is between values X and Z. X may represent no threat and Z may represent certain destruction. Numerical values or magnitudes may be used, for example, where X might be equal to zero and Z may be equal to 10. Any other ranges of values may be used. Non-numerical items such as colors or shapes may be used to represent values of X, Y and Z.

A specific height of a profile of a particular entity, such as a person or machine, may be indicated by a predetermined value B, which is between values A and C. A may represent a value of virtually no worldly significance and C may represent a value indicating a most worldly significance. Numerical values or magnitudes may be used, for example, where A might be equal to zero and C may be equal to 10. Any other ranges of values may be used. Non-numerical items such as colors or shapes may be used to represent values of A, B and C.

The threat level of a particular area or facility and the height of the profile of the entity, as indicated by their respective values, may indicate whether there is a need for a geo fence.

FIG. 1 is a diagram of an example screen 11 of a floor 12 in a building having a high profile person or visitor or object or vehicle 13 subject to location monitoring. The person or object 13 may have a location tag 14 attached. Screen 11 shows location sensors 15, cameras 16 and access readers and doors 17 across floor 12 of the building. Location sensors 15 may be represented with oval shaped symbols. Access readers and doors 17 may be represented with diamond or square shaped symbols. Cameras 17 may be represented by camera shaped symbols. The high profile person 13 or object 13 with location tag 14 may be monitored by the integrated security system. Location sensors 15, cameras 16 and access readers and doors 17 may be mapped or configured in a site map, floor map or a BIM/3D model.

Figure 2:
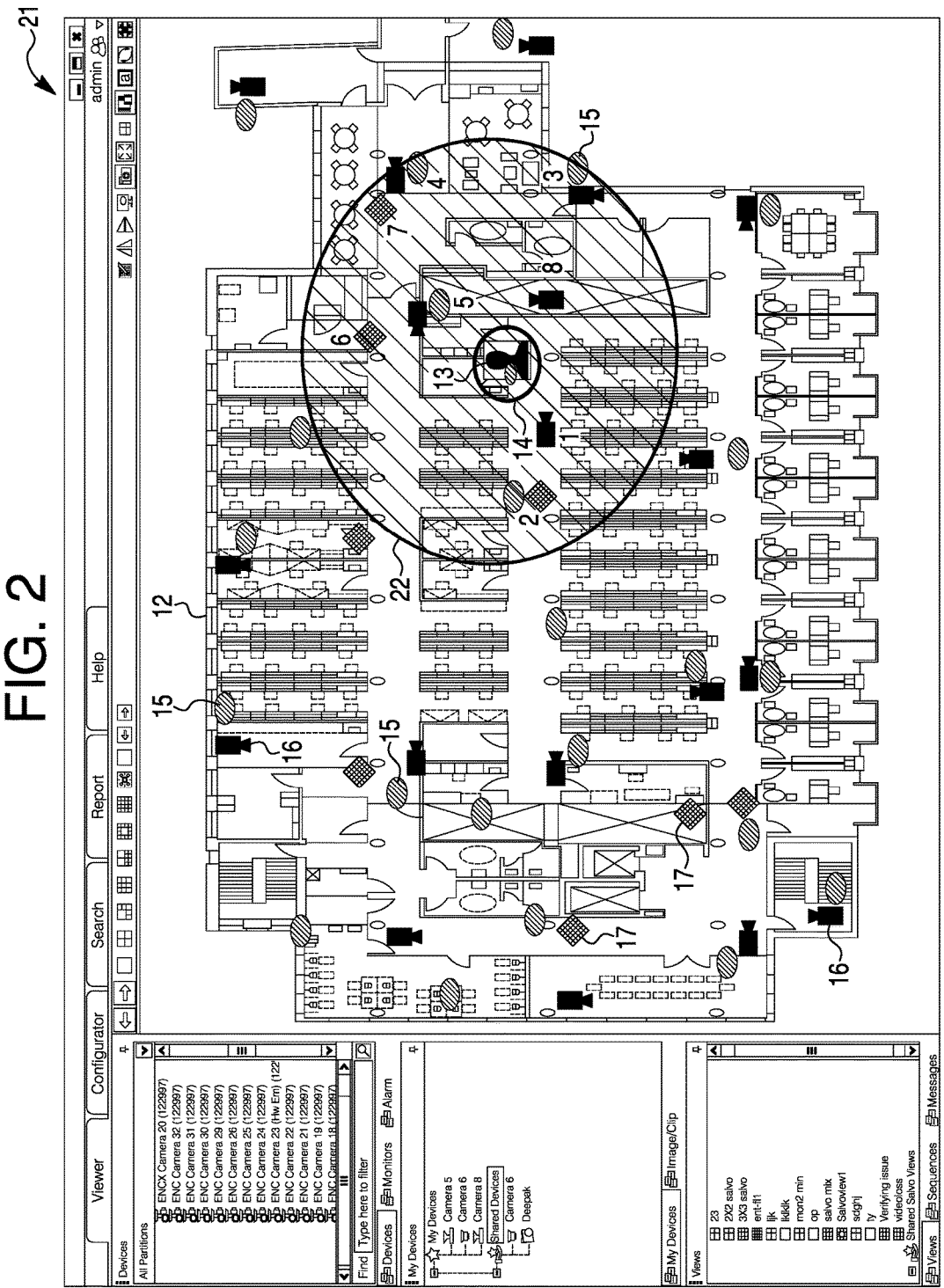
FIG. 2 is a diagram of a screen that shows floor with location sensors, cameras and access readers and doors.

FIG. 2 is a diagram of a screen 21 that shows floor 12 with location sensors 15, cameras 16 and access readers and doors 17. The system may check a location of person 13 or object 13 and define "geo-fencing" 22. The integrated security system may have a processor that checks security devices (i.e., cameras 16, location sensors 15, access readers 17 and doors 17) that fall under a geo-fenced area 22. The system may move a high threat level as high profile person 13 or vehicle 13 situated in a center of the area. As person 13 or vehicle 13 moves about floor 12, geo-fenced area may move also about floor 12, keeping person 13 or vehicle 13 moves at the center of area 22. Person 13 or vehicle 13 may be detected by the integrated security system according to location tag 14. Eight (8) devices may fall under geo-fencing area 22. The logical devices covered by area 22 may be identified by single digit numbers such as 1, 2, 3, 4, 5, 6, 7, 8 and 9. Examples of the devices may be location sensors 15 that detect location tag of person 13 or vehicle 13, cameras 16, access doors 17 and readers 17, and other security related devices. Security device locations of cameras 16, access doors 17, intrusion sensors 15, and location sensors 15 may be shown in a map view of screen 11.

Figure 3:
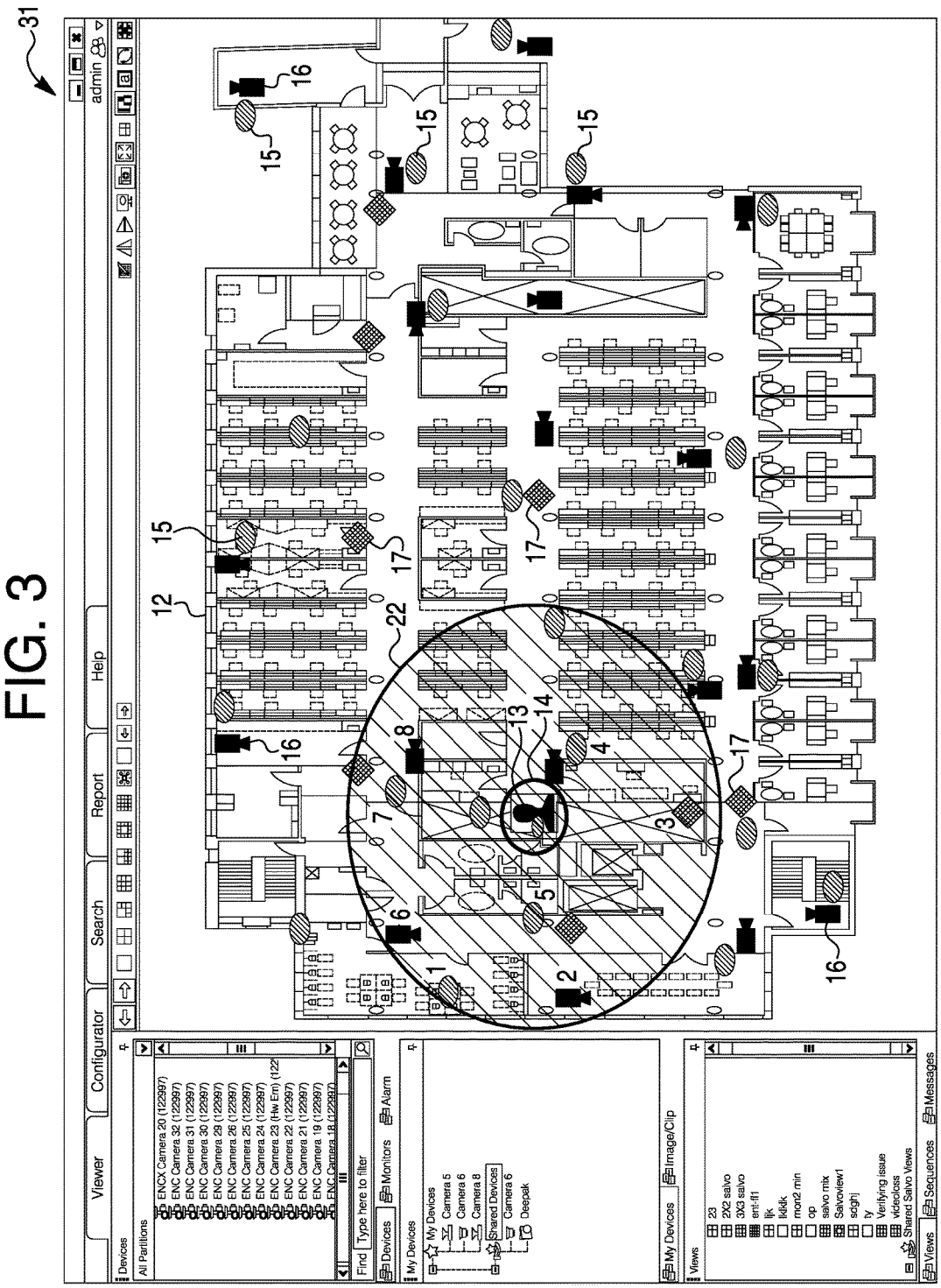
FIG. 3 is a diagram of a screen that reveals dynamic geo-fencing and application of a high threat level to the geo-fenced area that is circular and moves with high profile person or vehicle.

FIG. 3 is a diagram of screen 31 that reveals dynamic geo-fencing and application of a high threat level to the geo-fenced area 22 that is circular and moves with high profile person 13 or vehicle 13. As person 13 or vehicle 13 moves, its location may be updated in the integrated security system. The integrated security system may define updated geo-fencing area 22 and a new set of devices that fall under area 22 and are categorized to a high threat level virtually instantly. The updates may be based on a location of a secured person 13 or object 13. These data may be saved in the security system for further reviews. In area 22 of screen 31, nine devices may fall under geo-fencing area 22. The nine devices may be identified with single digit numbers. The devices such as location sensors 15, cameras 16 and access readers 17, doors 17 and other devices may be identified with the single digit numbers. However, as area 22 moves about floor 12, the single digit numbers may be associated with different devices, such as other cameras 16, location sensors 15, access readers 17 doors 17, and other security items. New data due to the movement of area 22 with high profile person 13 or object 13 may be saved by the integrated security system.

Figure 4:
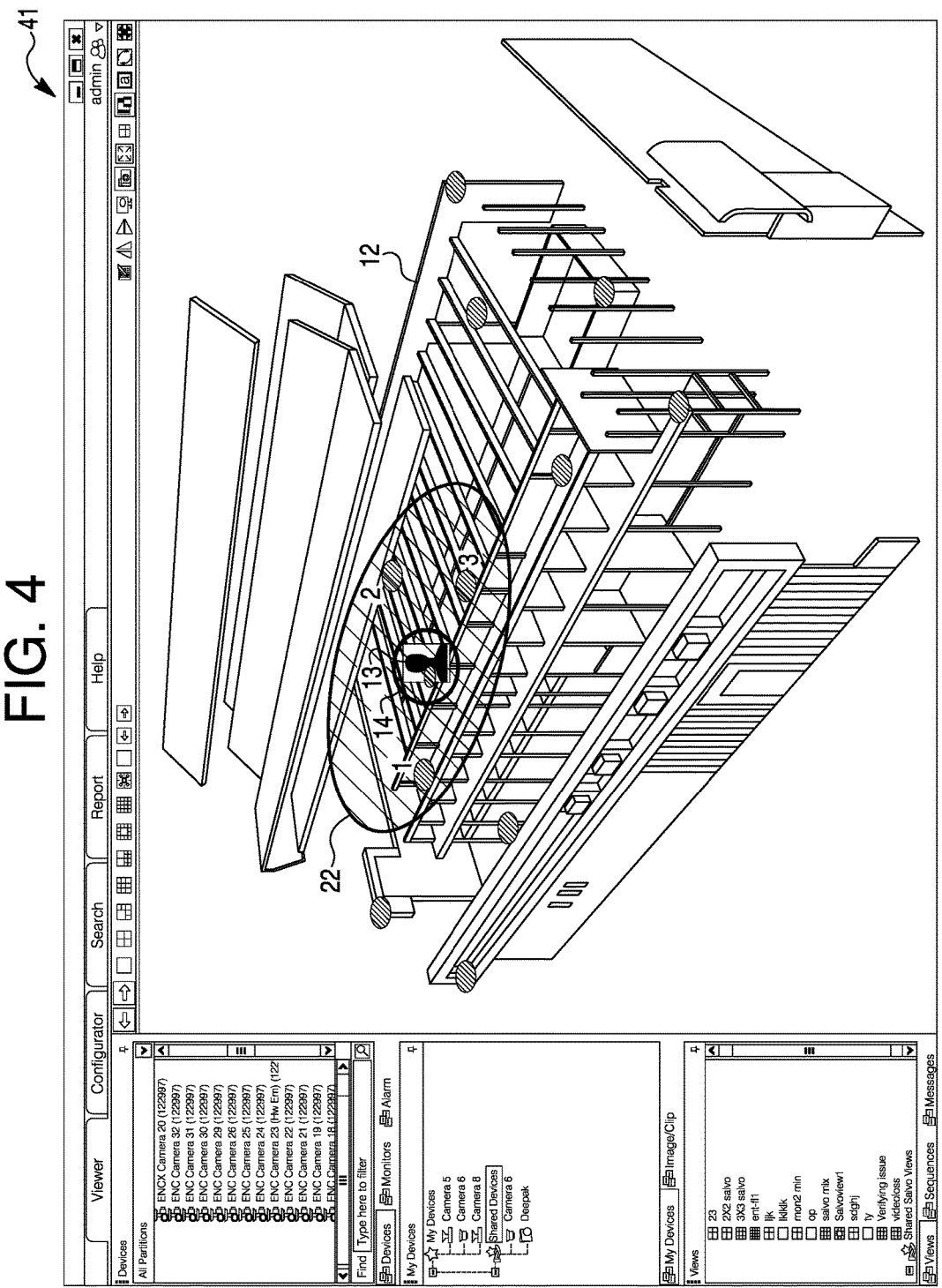
FIG. 4 is a diagram of a screen with three devices falling under a geo-fencing area.

FIG. 4 is a diagram of a screen 41. Similarly as in screen 31, BIM may be used to visualize a location of the high profile person 13 or object 13, and to see geo-fencing 22 area with a high threat level activation. In this case, some portion of floor 12 may be under geo-fencing area 22. In screen 41, three devices fall under geo-fencing area 22. The devices, which appear as location sensors 15, may be detected, identified and associated with single digit numbers 1-3. Data from the situation in screen 41 may be saved by the integrated security system.

Figure 5:
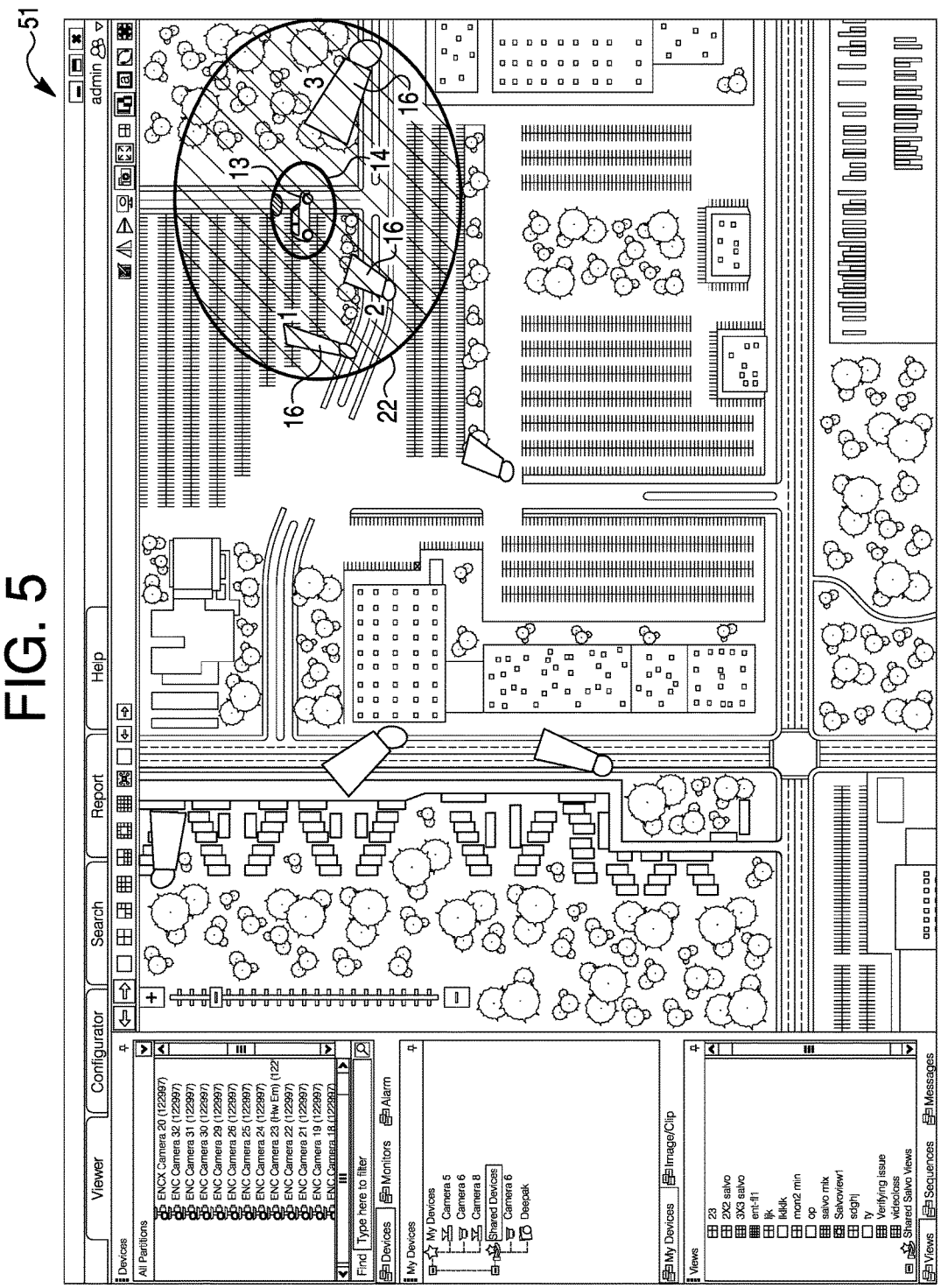
FIG. 5 is a diagram of a screen with the geo-fencing area be defined by an integrated security system based on a high profile visitor's vehicle.

FIG. 5 is a diagram of a screen 51. Geo-fencing area 22 may be defined by the integrated security system based on a high profile visitor's vehicle 13. In this case, cameras 16 may fall under geo-fenced area 22 and data from cameras 16 are streamed to a central or remote monitoring station. GPS and other long range sensing approaches may be used in the case. Three devices may fall under geo-fencing area 22 in screen 51. The devices, such as cameras 16, may be detected, identified and associated with single digits 1, 2 and 3.

To recap, a dynamic integrated security system may incorporate a processor, a user interface having a display connected to the processor, a plurality of security devices situated in a geographical area, and a security perimeter around a high profile entity initiated by a threat level having a predetermined magnitude. The security perimeter may be a geo-fence that incorporates a geo area around the high profile entity. The geo area may encompass one or more security devices. The one or more security devices in the geo area may be connected to the processor. The geo area may move and stay with the high profile entity upon a change of geographic position of the high profile entity. The one or more security devices within the geo area may be monitored and controlled for reducing or preventing effects of the threat level against the high profile entity. A height of a profile of the entity that reveals the entity to be a high profile entity may be equal to or greater than a predetermined magnitude. The predetermined magnitude may be B that is between A and C. A may represent no worldly importance and C may represent a most worldly significance. An increased height of a profile of an entity may require greater security and thus an increase of the geo area.

The high profile entity may be a person or a vehicle. The high profile entity may have at least one location sensor connected to the processor. The at least one location sensor may be selected from a group having a location tag selected from a group having Bluetooth low energy (BLE) beacon tags, radio frequency identification (RFID) tags, global positioning system (GPS) devices, mobile location devices, and wearable location indicators.

One or more security devices may be selected from a group having cameras, location sensors, access points, intrusion sensors, and lockable doors.

As the geo area moves, one or more security devices may be brought into the geo area and one or more security devices may be released from the geo area.

If the threat level exceeds the predetermined magnitude, then the geo area may increase in size. If the threat level becomes less than the predetermined magnitude, then the geo area may decrease in size. The predetermined threat level may be a predetermined magnitude Y between X and Z. X may represent no threat and Z may represent certain destruction.

The display may show the high profile entity, a map of where the high profile entity is located, the geo perimeter on the map, and the security devices in the geo area.

The high profile entity may have a location tag. One or more security devices may indicate to the processor global positioning coordinates of the location tag.

The geo area may be adjustable via the user interface.

The user interface may be accessed via a mobile phone or a cloud platform.

The geo area may be closed within a perimeter around the high profile entity situated within the geo area, even when the high profile entity moves from one geo graphical location to another to maintain the high profile entity within the geo area.

An approach in providing a security zone, may incorporate connecting a user interface having a display to a processor, detecting a threat level relative to an entity, generating a geo fence on the display to define a security zone around the entity, tracking the entity to maintain the security zone around the entity, and connecting security devices within the security zone to the processor. The threat level may exceed a predetermined magnitude to generate the geo fence.

When the entity moves geographically, the security zone around the entity may move with the entity. As the security zone moves with the entity, the processor may disconnect security devices when the security zone moves outside of the security devices, and the processor may connect security devices when the security zone moves over an area that incorporates the security devices.

The security zone, the entity and the security devices may be monitored with a mobile phone.

The processor may be situated in the cloud.

One or more of the security devices may be selected from a group having location sensors, access points, controlled doors, cameras and intrusion sensors.

A mechanism having a dynamic security zone, may incorporate a monitoring station having a processor and a display, a first area subject to a threat level, one or more security devices situated in the first area, connectable to the monitoring station, and a geo-fence forming a perimeter around a place for an entity needing protection to reduce the threat level at the place. The perimeter and a second area within the perimeter may move with the place for an entity. Any of the one or more security devices within the second area may be connected to the monitoring station.

The mechanism may further incorporate a network interface connected to the monitoring station.

The mechanism may further incorporate a cloud interface connected to the monitoring station.

The geo fencing may be based on coordinates generated from a global positioning system.

A smart phone may connect with the monitoring station to monitor and control the geo fence. Security devices under the geo fence area may be extended to one or more other systems selected from a group having fire detection and alarm systems, building management systems (BMSs), public address systems, and HVAC systems, or temperatures and comfort of the geo fenced area may be improved via BMSs and HVAC systems.

U.S. patent application Ser. No. 14/934,543, filed Nov. 6, 2015, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A dynamic integrated security system comprising:
a processor;
a user interface having a display connected to the processor;
a plurality of security devices situated in a first geographical area, the plurality of security devices communicatively coupled to the processor and configured to monitor one or more parameters of the first geographical area; and
a security perimeter around a high profile entity initiated by a threat level having a predetermined magnitude, wherein the processor is configured to equip the high profile entity with a location tag to establish the security perimeter and track the high profile entity; and
wherein:
the security perimeter is a geo-fence that incorporates a second geographical area around the high profile entity;
the second geographical area moves and stays with the high profile entity upon a change of geographic position of the high profile entity;
the plurality of security devices within the first geographical area are monitored and controlled by the processor for reducing or preventing effects of the threat level against the high profile entity, and one or more of the plurality of security devices are configured to enter a high threat mode when the high profile entity enters the first geographical area and the processor provides specialized security coverage using the one or more of the plurality of security devices and provides the one or more parameters from the one or more of the plurality of security devices on the display of the user interface until the high profile entity exits the first geographical area and the one or more of the plurality of security devices exit the high threat mode;
a value of a profile of the entity that reveals the entity to be a high profile entity is a predetermined magnitude;
the predetermined magnitude of the value of the profile is B, which is between A and C;
A represents absence of worldly importance;
C represents most worldly importance;
the predetermined magnitude of the threat level is Y, which is between X and Z;
X represents absence of a threat of harm; and
Z represents certain destruction.

2. The system of claim 1, wherein:
the high profile entity is a person or a vehicle;
the high profile entity has at least one location sensor connected to the processor; and
the at least one location sensor is selected from a group comprising the location tag selected from a group comprising BLE beacon tags, RFID tags, GPS devices, mobile location devices, and wearable location indicators.

3. The system of claim 1, wherein one or more security devices are selected from a group comprising cameras, location sensors, access points, intrusion sensors, and lockable doors.

4. The system of claim 1, as the first geographical area moves, one or more security devices can be brought into the first geographical area and one or more security devices can be released from the first geographical area.

5. The system of claim 1, wherein:
if the threat level exceeds the predetermined magnitude, then the first geographical area increases in size; and
if the threat level becomes less than the predetermined magnitude, then the first geographical area decreases in size.

6. The system of claim 1, wherein the display shows the high profile entity, a map of where the high profile entity is located, the security perimeter on the map, and the plurality of security devices in the first geographical area.

7. The system of claim 1, wherein:
the high profile entity has the location tag; and
one or more security devices indicate to the processor global positioning coordinates of the location tag.

8. The system of claim 1, wherein the first geographical area is adjustable via the user interface.

9. The system of claim 1, wherein the user interface can be accessed via a mobile phone or a cloud platform.

10. The system of claim 1, wherein the second geographical area is circular with the high profile entity situated at the center of the second geographical area, even when the high profile entity moves from one geo graphical location to another.

11. A method in providing a security zone, comprising:
connecting a user interface having a display to a processor;
detecting a threat level relative to an entity;
equipping the entity with a location tag;
generating a geo fence on the display to define a security zone around the entity in response to equipping the entity with the location tag;
tracking the entity to maintain the security zone around the entity;
connecting security devices within a geographical area to the processor;
identifying that the entity has entered the geographical area;
identifying that the threat level exceeds a predetermined magnitude when the entity is in the geographical area;
placing the security devices in a high threat level mode in response to identifying that the threat level exceeds the predetermined magnitude;
providing specialized security coverage using the security devices and monitoring data from the security devices on the display of the user interface in response to placing the security devices the high threat level mode; and
removing the security devices from the high threat level mode when the entity exits the geographical area.

12. The method of claim 11 wherein:
when the entity moves geographically, the security zone around the entity moves with the entity; and
as the security zone moves with the entity, the processor disconnects security devices when the security zone moves outside of the geographical area, and the processor connects second security devices when the security zone moves over an area that incorporates the second security devices.

13. The method of claim 12, wherein the security zone, the entity and the security devices are monitored with a mobile phone.

14. The method of claim 12, wherein the processor is situated in the cloud.

15. The method of claim 12, wherein one or more of the security devices are selected from a group comprising location sensors, access points, controlled doors, cameras and intrusion sensors.

16. A mechanism having a dynamic security zone, comprising:
   a monitoring station comprising a processor and a display;
   a first area subject to a threat level;
   one or more security devices situated in the first area connectable to the monitoring station, the one or more security devices configured to monitor one or more physical parameters of the first area; and
   a geo-fence forming a perimeter around a place for an entity needing protection to reduce the threat level at the place, wherein the processor is configured to equip the entity with a location tag to establish the geo-fence and track the entity; and
   wherein:
   the perimeter and a second area within the perimeter move with the place for an entity; and
   any of the one or more security devices within the second area are connected to the monitoring station and the one or more physical parameters are monitored and controlled by the processor and the one or more of the plurality of security devices are configured to enter a high threat mode when the entity enters the first area and the processor provides specialized security coverage using the one or more security devices and provides the physical parameters from the one or more security devices on the display until the entity exits the first area and the one or more devices exit the high threat mode.

17. The mechanism of claim 16, further comprising a network interface connected to the monitoring station.

18. The mechanism of claim 16, further comprising a cloud interface connected to the monitoring station.

19. The mechanism of claim 16, wherein the geo-fence is based on coordinates generated from a global positioning system.

20. The mechanism of claim 16, wherein:
   a smart phone connects with the monitoring station to monitor and control the geo-fence; the one or more security devices in the first area are extended to one or more other systems selected from a group comprising fire detection and alarm systems, building management systems (BMSs), public address systems, and HVAC systems; or
   temperatures and comfort of the first area are improved via BMSs and HVAC system.

* * * * *